(12) United States Patent
Brenneis et al.

(10) Patent No.: US 9,352,709 B2
(45) Date of Patent: May 31, 2016

(54) METHOD FOR OPERATING A MOTOR VEHICLE DURING AND/OR FOLLOWING A COLLISION

(71) Applicant: AUDI AG, Ingolstadt (DE)

(72) Inventors: Oliver Brenneis, Garching (DE); Jörn Freyer, München (DE); Christopher Hantschke, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/390,500

(22) PCT Filed: Apr. 2, 2013

(86) PCT No.: PCT/EP2013/000969
§ 371 (c)(1),
(2) Date: Oct. 3, 2014

(87) PCT Pub. No.: WO2013/149720
PCT Pub. Date: Oct. 10, 2013

(65) Prior Publication Data
US 2015/0094901 A1    Apr. 2, 2015

(30) Foreign Application Priority Data
Apr. 5, 2012   (DE) .................. 10 2012 007 119

(51) Int. Cl.
*G01M 17/00*      (2006.01)
*B60R 16/03*      (2006.01)
*B60W 50/029*     (2012.01)
*B60R 21/01*      (2006.01)
(Continued)

(52) U.S. Cl.
CPC ............... *B60R 16/03* (2013.01); *B60R 21/00* (2013.01); *B60R 21/01* (2013.01); *B60W 50/029* (2013.01); *G07C 5/00* (2013.01); *B60K 2028/006* (2013.01); *B60R 2021/01252* (2013.01); *B60W 2050/0295* (2013.01)

(58) Field of Classification Search
None
See application file for complete search history.

(56) References Cited

U.S. PATENT DOCUMENTS

| 5,565,711 A | 10/1996 | Hagiwara |
| 2003/0001434 A1* | 1/2003 | Saito ................. B60G 17/0185 307/10.1 |

(Continued)

FOREIGN PATENT DOCUMENTS

| CN | 1460304 A | 12/2003 |
| CN | 1759528 A | 4/2006 |

(Continued)

OTHER PUBLICATIONS

International Search Report issued by the European Patent Office in International Application PCT/EP2013/000969.
(Continued)

*Primary Examiner* — Thomas Tarcza
*Assistant Examiner* — Garrett Evans
(74) *Attorney, Agent, or Firm* — Henry M. Feiereisen LLC

(57) ABSTRACT

A method for operating a motor vehicle (1), particularly the supply of power to a motor vehicle (1), during and/or in the time period following a collision, wherein the motor vehicle (1) is at least partially deenergized, wherein the supply of electrical power of a vehicle system (9) is determined and switched during and/or following the collision based on at least one criterion (15).

10 Claims, 1 Drawing Sheet

(51) Int. Cl.
  *B60R 21/00*   (2006.01)
  *G07C 5/00*   (2006.01)
  *B60K 28/00*   (2006.01)

(56) References Cited

U.S. PATENT DOCUMENTS

| | | |
|---|---|---|
| 2004/0256169 A1 | 12/2004 | Budzilovich et al. |
| 2005/0285445 A1* | 12/2005 | Wruck .................... H02J 1/14 307/10.1 |
| 2007/0241614 A1* | 10/2007 | Busdiecker ............ H02J 1/14 307/10.1 |
| 2008/0018293 A1 | 1/2008 | Schmidt et al. |
| 2008/0185235 A1 | 8/2008 | Suzuki |
| 2010/0292885 A1 | 11/2010 | Hiemer |
| 2013/0261869 A1 | 10/2013 | Brenneis et al. |

FOREIGN PATENT DOCUMENTS

| | | |
|---|---|---|
| CN | 2009 95629 Y | 12/2007 |
| CN | 201240272 Y | 5/2009 |
| DE | 42 08 011 A1 | 9/1993 |
| DE | 10 2004 057 828 A1 | 6/2006 |
| DE | 10 2005 037 961 A1 | 2/2007 |
| DE | 20 2006 017 518 U1 | 2/2007 |
| DE | 10 2006 034 499 A1 | 1/2008 |
| DE | 10 2007 002 834 A1 | 7/2008 |
| DE | 10 2008 006 555 A1 | 8/2008 |
| DE | 102008008555 A1 | 8/2008 |
| DE | 10 2007 024 396 A1 | 11/2008 |
| DE | 10 2008 043 637 A1 | 5/2010 |
| DE | 10 2008 053 962 A1 | 5/2010 |
| DE | 10 2009 039 913 A1 | 6/2010 |
| DE | 10 2011 010 230 A1 | 8/2012 |
| DE | 10 2011 115 223 A1 | 3/2013 |
| JP | 2005 238 934 | 9/2005 |
| WO | WO 2004/078527 A1 | 9/2004 |

OTHER PUBLICATIONS

Chinese Search Report issued on Nov. 30, 2015 with respect to counterpart Chinese patent application 201380017908.7.
Translation of Chinese Search Report issued on Nov. 30, 2015 with respect to counterpart Chinese patent application 201380017908.7.

* cited by examiner

METHOD FOR OPERATING A MOTOR VEHICLE DURING AND/OR FOLLOWING A COLLISION

CROSS-REFERENCES TO RELATED APPLICATIONS

This application is the U.S. National Stage of International Application No. PCT/EP2013/00969, filed Apr. 2, 2013, which designated the United States and has been published as International Publication No. WO 2013/149720 and which claims the priority of German Patent Application, Serial No. 10 2012 007 119.1, filed Apr. 5, 2012, pursuant to 35 U.S.C. 119(a)-(d).

BACKGROUND OF THE INVENTION

The invention relates to a method for operating a motor vehicle, in particular the supply of power of a motor vehicle, during a collision and/or during a time period following a collision, wherein the motor vehicle is at least partially deenergized. In addition, the invention relates to a motor vehicle with at least one control device configured to carry out the method.

Active and passive safety systems, which are designed in particular for collision avoidance and/or collision mitigation, are already known in the prior art. For example, such systems can verify, usually based on a collision probability, whether the risk of a collision exists, so that various measures can be attempted to avoid a collision and/or to at least to minimize the damage resulting from a collision. Measures can include active driving interventions, but may also include also measures enhancing the overall safety of the vehicle, such as raising an engine hood, and/or issuing warnings and/or instructions, as well as controlling additional vehicle systems, for example for preconditioning. For example, it is known to adapt the operating parameters of vehicle systems in advance of a potential or unavoidable collision with respect to the particular situation, so as to, for example, reduce delay times and the like.

When a collision is inevitable, i.e. when the dynamic possibilities of the motor vehicle through driving interventions are no longer adequate to avoid a collision with a collision partner, then other problems may arise after the initial collision, for example, consequential collisions. However, it has been proposed in today's motor vehicles to completely deenergize the motor vehicle when a collision exceeds a certain collision severity, for which, for example, at least one collision severity value can be considered, which must be greater than a threshold value, meaning to disconnect at least one electrical power source of the motor vehicle, in particular at least one battery, from all loads. This approach should not only prevent dangerous high voltages for the driver caused by damage in the energy supply system of the motor vehicle or dangerous situations caused by the continued operation of electrical components, especially fires, but also protect rescuers that may have to work on the motor vehicle. Accordingly, motor vehicles are known where the main power is disconnected from the loads when the collision severity value exceeds a threshold value, usually already during, or at least immediately after the collision, to ensure that the safety system disconnecting the energy does not fail.

In this way, however, the safety systems of the motor vehicle are also deenergized, so that the safety systems can no longer be triggered again, in particular following a first accident, i.e. the collision. This increases the severity of subsequent collisions, since accident-severity-mitigating measures for a subsequent collision can no longer be initiated after the first collision.

It was proposed in this context in the later published German patent application DE 10 2011 115 223.0, to provide in a method for operating a safety system of a motor vehicle, in particular a system for collision mitigation in an unavoidable collision, that in an unavoidable collision, the safety system determines a collision target trajectory of the motor vehicle to be realized after the collision and having a definite target position with respect to consequential collisions, and carries out at least one autonomous and/or assistive driving intervention in the form of at least one longitudinal guidance intervention and/or lateral guidance intervention for realizing the target trajectory, in order to increase the safety with respect to subsequent collisions after a first collision. The goal is to ultimately assume a safe target position with the lowest possible consequential collision probability.

SUMMARY OF THE INVENTION

It is therefore the object of the invention to provide a method which makes it possible to increase the safety of the motor vehicle during and/or following a collision both with respect to the electrical power supply and with respect to consequential collisions.

To attain this object, a method of the aforementioned type provides according to the invention that the power supply of a vehicle system is determined and switched during and/or after the collision based on at least one criterion.

The method may be carried out, for example, by a dedicated control device of the motor vehicle; however, the functions can also be distributed across a plurality of control devices. Ultimately, according to the invention, the energy management of the motor vehicle is extended with regard to the particular circumstances of a collision by evaluating collision-related criteria for each vehicle system of the motor vehicle, so that the vehicle systems of the motor vehicle are ultimately gradually deenergized, until ideally all vehicle systems are deenergized, meaning that they are disconnected from the electric power source, in particular at least one battery. This makes it possible to keep the vehicle systems that can still contribute to improve safety after the collision initially active, whereas systems that are not required to enhance safety or that are even detrimental with respect to safety, can be deactivated as quickly as possible, especially immediately after the collision. When vehicle systems, especially safety systems able to increase the safety after the collision are still active, it is feasible to selectively initiate measures after the first collision resulting in an overall increase in the safety both with respect to the electrical energy supply as well as to measures performed by the safety systems. This is achieved by considering criteria that are specifically adapted to the presence of such an accident, especially to the presence of the specific accident.

The method of the invention can thus ensure that the vehicle systems that are still able to increase the safety of the motor vehicle continue to be supplied with electrical energy and can still carry out their measures. In this way, the severity of secondary accidents can be reduced and the safety of the driver and the occupants can be increased.

In an advantageous development of the invention, in the context of a criterion, the vehicle systems can be divided into at least two classes of vehicle systems, wherein the power supply is at least partially determined depending on the class association of the vehicle system. All vehicle systems are therefore divided into at least two classes, which at least in part determine the subsequent handling of these vehicle systems in terms of the power supply, in particular immediately following a collision.

For example, at least one first class of vehicle systems to be deenergized directly during and/or after the collision, especially at the beginning and/or after the conclusion of the collision, can be used. For example, vehicle systems can be identified that need to be immediately disconnected from the power supply, thereby avoiding problems caused by a continuing flow of electrical energy. Such class of vehicle systems can already be taken into account in the design of power distribution in the motor vehicle, so that, for example, a single switch may be provided for all vehicle systems of this first class, which is opened, in particular immediately after the collision, in order to prevent further current flow to these vehicle systems. Examples of vehicle systems associated with the first class are, for example, the fuel pump and/or the comfort electronics and/or a rear window defroster and/or infotainment systems, and the like. For example, by deenergizing a fuel pump immediately during and/or after the collision prevents, for example, that fuel which could ignite continues to be pumped out of the leak of a defective fuel line. Comfort electronics, such as multimedia systems and the like may contribute little to enhance the safety of the motor vehicle, also components of an air conditioning system, for example, a climate control device and/or an air conditioner compressor. Systems falling into the first class are therefore mainly those which may be considered to be unable to enhance the safety and to simultaneously provide any essential data for vehicle systems that can enhance the safety of the motor vehicle.

Furthermore, a second class of vehicle systems can be used that are independently deenergized only after a safety action has been performed, wherein the vehicle systems of the second class are deenergized after the safety action has been performed. The so-defined second class of vehicle systems refers to vehicle systems, especially safety systems, able to always enhance the safety of the motor vehicle by way of a specific, clearly defined action, in particular regarding a consequential collision. A classic example herefor is an engine hood that can be raised and whose deployment is generally useful after a serious accident with respect to consequential collisions. Another example of systems of the second category is, for example, a safety system, which adjusts the vehicle's height by adjusting the height of the suspension, in particular with regard to crash compatibility. In general, so-called pre-crash measures, i.e. measures in preparation of collisions, to the extent that these collisions are not already completed, can be completed or started. A complete pre-crash concept of default measures can therefore be defined which bring the vehicle into the safest possible condition regarding a collision, in this example a consequential collision. In addition to the aforementioned examples, in particular a sunroof may be closed, seats may be moved to a certain position, and the like. The method according to the invention now ensures that, before the vehicle systems responsible for these measures are deenergized, these measures have already taken place or are still taking place (to the extent possible, as will be discussed in more detail below). For example, when the safety measures were carried out before the collision, corresponding vehicle systems of the second class can be deenergized immediately, whereas when the safety measures can still be carried out, their implementation is first initiated by an appropriate control of the vehicle system of the second class, which can also be performed by the control device carrying out the method according to the invention. When the safety action is concluded, the respective vehicle system can be deenergized. As already stated, it is particularly advantageous in this context when the motor vehicle is brought into at least one predefined safety condition by the safety action.

Other examples of vehicle systems of the second class are also locking systems. For example, it may be ensured before the corresponding vehicle system is deenergized that the trunk is freely accessible, in particular not locked. This allows access to auxiliary equipment optionally arranged therein, in particular a warning triangle, a first aid kit and the like. A vehicle system sending an emergency message that can use a phone connection for example to inform a control room about the accident can continue to be supplied with electricity, in particular by sending additional information, such as the accident location, until an acknowledgment or the like is received. Such systems can also be referred to as "Emergency Call Systems".

In another advantageous embodiment of the present invention, a third class of vehicle systems dependent from other vehicle systems and/or available data may be deenergized when an availability criterion indicating that one or more predefined other vehicle systems and/or data are not available is satisfied. In addition to the vehicle systems contained in the second class, there are those that can only perform measures for increasing the safety of the motor vehicle when they cooperate with other vehicle systems, for example, control the steering or the like and/or are able to obtain data from sensors or which depend on the presence of specific data. Thus, continuous monitoring according to the invention takes place as to whether the vehicle system, especially due to its interrelationship with other vehicle systems, can still perform actions supporting the safety in a meaningful way. A simple example of such vehicle system is, for example, a multi-stage airbag system which can be triggered after a first trigger event a second time after another collision. Such an airbag system can no longer be reasonably deployed when the collision sensors representing another vehicle system have failed, meaning that the airbag system can no longer receive any information about the event that will trigger it for a second time. Thus, for example, such a multi-level airbag system can be activated when it was determined during an appropriate inspection, in particular a diagnosis, that its associated collision sensors are no longer available and the information it can also not be otherwise obtained.

In another example for a vehicle system of the third class, an ESP system is unable to perform any meaningful counter-control actions, for example during a spin, unless it receives any information from an inertial platform, in particular yaw rates and the like. Examples for vehicle systems of the third class are also safety systems already mentioned in the later published DE 10 2011 1 5 223.0, which attempt to analyze environmental data and the own data of the motor vehicle in order to perform driving interventions. However, it must be ensured in this case that an adequate data base exists for making decisions, and must also be ensured that executing components are present to implement the required measures. In summary, criteria can be formulated with which the operation of a vehicle system still makes sense, whereby situations must obviously also be considered wherein a vehicle system provides data to a downstream vehicle system which can then perform actions. When the downstream vehicle system is still available, the vehicle system supplying data does not necessarily need to be deenergized.

It should be noted at this point that it is also within the scope of the present invention to replace vehicle systems delivering data, which is always possible in particular when similar data taken before the collision are adequate to identify the current data, or to at least assess the current data with a specific certainty. For example, an environmental model may be considered. Environmental models are already known in the art and generally exist in various forms wherein, however, different attributes are usually associated with areas and/or objects. When the motor vehicle is still in the same environment, many data recorded before the collision, especially regarding static objects can be reused, even when sensors that would refresh the data are no longer available. Ultimately, data sources, in particular sensors that could be damaged in the collision, may be constantly monitored. When such damage exists, the data recorded prior to the collision may conceivably be accessed. Diagnostic functions reporting the failure of sensors or of other data sources, especially of other vehicle systems, are already generally known; however, these diagnostic functions may be enhanced with respect to the accuracy of the statements about the damage. For example, when a sensor is in principle still functional, but is oriented in the wrong direction as a result of the collision, thus preventing useful measured data, the sensor can still be identified as currently not reliable or only partially reliable, in particular deenergized. Such information may be obtained, for example, by a plausibility check of recorded sensor data. Overall, within the context of the present invention, data may also be used that were determined before and/or during the collision, in particular by forecasting future trends or by assuming that the data are substantially unchanged.

Since it may be an object of the operating method of the invention to completely deenergize the motor vehicle, additional availability criteria, in particular the criteria arranged downstream of the availability criterion may be employed. For example, a vehicle system that is not deenergized by the availability criterion may be deenergized when at least one other criterion describing the execution of a safety action and/or the non-availability of a safety action enhancing the safety of the motor vehicle- and/or a criterion describing the expiration of a certain period of time is satisfied. Even when vehicle systems were still generally functioning, it would only make sense to continue their operation in the presence of reasonable measures, i.e. safety actions that could be performed by these systems. When this is not the case, or after all reasonable safety actions have already been carried out, the vehicle system can be deactivated. However, it is also conceivable to set a predetermined time period after which the vehicle systems are nevertheless deenergized.

As already mentioned, environmental data of an environmental model determined before the collision may be considered as data. Such environmental model may also be augmented in particular with respect to moving objects with predicted data, in particular when certain data sources, in particular sensors have failed. In this way, it is possible to continue operating vehicle systems using the environmental model at least for a certain period of time in order to increase the safety of the motor vehicle, in particular in respect of consequential collisions.

When it is the object of the method according to the invention to completely deenergize all vehicle systems of the motor vehicle, a criterion describing the expiration of a predetermined period of time after the collision may be used for all vehicle systems. This means that all vehicle systems are deenergized when this criterion is satisfied, thus ensuring that there is no longer a danger due to residual current flows. For example, such a period of time may be selected to last from two to six minutes, more particularly five minutes.

As already mentioned, diagnostic procedures for vehicle systems are already known in the prior art, for example built-in diagnostic functions reporting a status of a vehicle system, but also diagnostic actions performed by other control devices producing as a result the status of a vehicle system. These can also be advantageously used according to the invention to control deenergizing of vehicle systems, by advantageously ensuring that a diagnostic process of at least a portion of the vehicle systems is performed, wherein as a result of the diagnosis the vehicle system is deenergized when the vehicle system is not available. Thus, it can be determined whether a vehicle system is available at all or even to a sufficient degree, in which case, when the functionality of the vehicle system is no longer sufficient to contribute to the safety of the motor vehicle, the vehicle system is deenergized. This is ideally done by way of constant, for example, cyclic surveillance, wherein the results can of course also be used for the assessment of the third class of vehicle systems, as described above.

In another advantageous embodiment of the present invention, at least one criterion may include a prioritization, where vehicle systems having higher priority are deenergized later, depending on the available power, than vehicle systems having lower priority. For example, it may also happen following a collision, that, for example due to a malfunction, the full power of the electrical energy source, in particular of at least one battery, is no longer available, so that in this case a prioritization may advantageously be performed, which may reflect the extent to which individual vehicle systems contribute to the overall safety of the motor vehicle. The remaining current is then intelligently distributed based on the prioritization, so that the energy can be suitably managed even with such restriction.

Furthermore, an ideal action plan realizing at least one action of at least one vehicle system for enhancing the safety may be determined and, depending on the results of a diagnosis of at least one vehicle system affected by the action plan, a realizable action plan with at least one remaining action of at least one vehicle system may be determined, wherein the presence of an action in the realizable action plan associated with a vehicle is used as a criterion. For example, an action plan may be contemplated which is based on the availability of all required vehicle systems. However, when the analysis indicated that some vehicle systems are not functional or are no longer fully functional, an adjustment may be made, wherein it may be assessed to which extent the action plan, in particular which actions, are still feasible at all. The feasible actions thus remain in the action plan, thus producing a feasible action plan. When a vehicle system is to the assessed that is associated with an action still to be performed in the action plan, this vehicle system will continue to receive electrical energy, whereas when this criterion is not satisfied, the vehicle system can be deenergized (unless another criterion requires that a supply of electrical energy still remains). The evaluation and implementation of this action plan, in particular the control of vehicle systems in order to perform actions, may conveniently be performed in the same control device as the general energy management of the present invention; however, it is also conceivable to provide for this purpose a special control device communicating with the control device responsible for the energy management. Overall, it is thus monitored in this variant of the invention, what is still possible, and the energy supply of the vehicle systems is carried out commensurate therewith.

According to another advantageous embodiment of the present invention, the entire motor vehicle may be completely deenergized when the vehicle system evaluating the criteria is not available. As a sort of fallback position in case of failure of the energy management according to the invention, the motor vehicle may be completely deenergized for safety's sake by way of a central switch, in particular when the control device evaluating the criteria itself is affected by a failure, so then all vehicle systems are disconnected from the power supply. This further enhances the safety.

Advantageously, a warning signal directed to emergency personnel may be outputted when at least one vehicle system is not deenergized. Therefore, when currents still flow in the motor vehicle according to the invention in a time period subsequent to the collision, a warning signal may be outputted advising the rescue workers that the motor vehicle is not yet fully deenergized. While dedicated warning devices, for example special warning lamps, may be provided for this purpose, certain vehicle lights may be operated with a special pattern because the operation of a light bulb would indicate to the rescuers that electrical activity still prevails in the motor vehicle. However, audible alarms and the like are also conceivable. Of course, the vehicle system issuing the warning will also remain under power.

Especially in this context, it may also be useful when in a motor vehicle designed for carrying of the method of the invention, even when the motor vehicle is powered only by a combustion engine, a central switch accessible to the rescuers is provided for deenergizing the motor vehicle. Such a switch is already known in the prior art for hybrid vehicles and electric vehicles under the name "Service Disconnect." This concerns in particular the protection of rescuers from the risks associated with a high-voltage battery.

However, such a "Service Disconnect" may also be useful in motor vehicles without a high voltage battery since effects, especially short circuits and the like may occur, which may contribute to the development of electrical problems.

In addition to the method, the present invention also relates to a motor vehicle, with at least one control device designed for implementing the method according to the invention. All embodiments with respect to the inventive method can be applied analogously to the motor vehicle according to the invention, which thus provides the same advantages. In particular the motor vehicle includes at least one on-board electrical system, which is powered by at least one electrical energy source, in particular by at least one battery. The on-board electrical system supplies several vehicle systems of the motor vehicle. The supply of power to certain vehicle systems, optionally at least partly also to groups of vehicle systems, can be controlled via a corresponding switching device. This switching device is then controlled by the control device that controls the method of the invention, so as to deenergize the vehicle systems step-by-step based on the criteria.

BRIEF DESCRIPTION OF THE DRAWING

Further advantages and details of the present invention will become apparent from the exemplary embodiments described hereinafter and with reference to the drawings. The drawings show in.

DETAILED DESCRIPTION OF PREFERRED EMBODIMENTS

Figure 1:
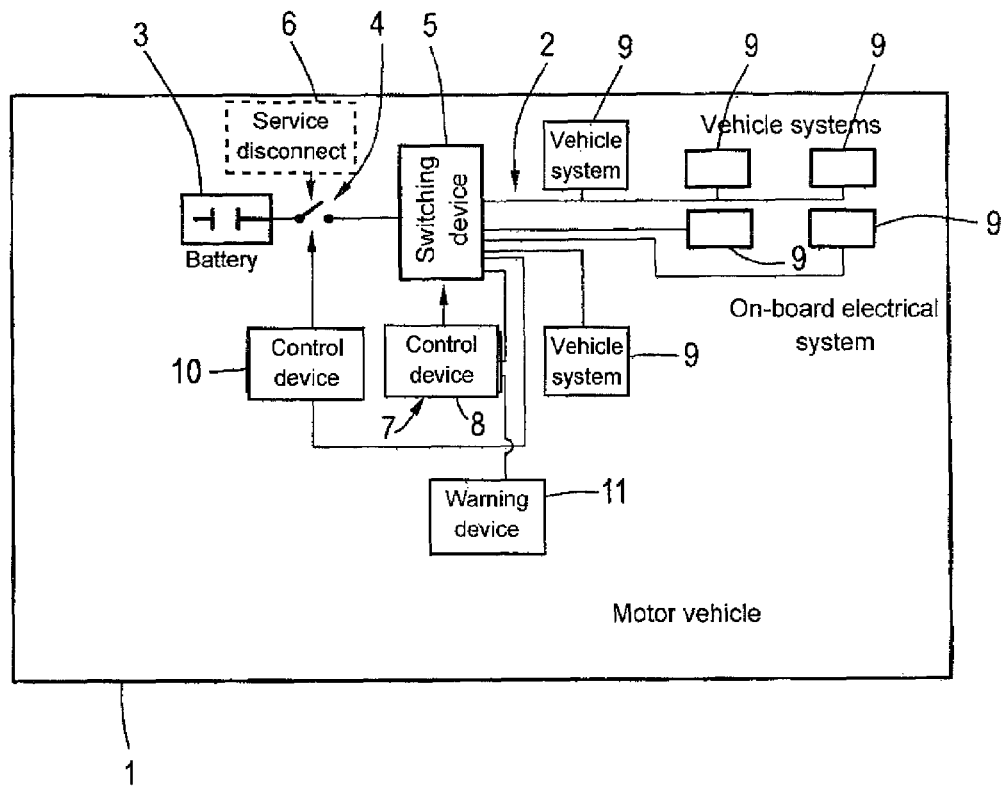
FIG. 1 a schematic diagram of a motor vehicle according to the invention.

FIG. 1 shows a schematic diagram of a motor vehicle 1 according to the invention. The motor vehicle 1 has, as is generally known, an on-board electrical system 2 for supplying power to various vehicle systems of the motor vehicle 1. The on-board electrical system 2 is energized by an electrical power source, here a battery 3. A main switch 4 and a switching device 5 thereby determine, which vehicle system is to be supplied with electrical energy, wherein with respect to the main switch 4 a service disconnect device 6 can enable a complete disconnection of the battery 3 from the on-board electrical system 2. A vehicle system includes a battery management system 7 with a control device 8, which is configured to carry out the method according to the invention, which the following description will address in more detail.

The method according to the invention relates to the operation of the motor vehicle 1, in particular with regard to the electric power supply, in a time period immediately following a collision. Based on various criteria, which will be described in more detail below, the control device 8 controls the switching device in order to continue to either provide power to all other vehicle systems 9, some of which are illustrated only by way of example, or to deenergize them, as long as these vehicle systems cannot contribute further to the safety of the motor vehicle 1, in particular with respect to consequential collisions.

The functionality of the control device 8 itself is also monitored, in this case by a control device 10, wherein the main switch 4 is immediately controlled in the event that the control device 8 of not available and the vehicle 1 is completely deenergized, meaning that the battery 3 is disconnected from the on-board electrical system 2, so that electrical energy ca no longer be provided to any of the vehicle systems 7, 9 or the control device 10.

Furthermore, a warning device 11 is associated with the control device 8, via which a warning can be outputted following a collision, as long as the on-board electrical system 2 is not completely deenergized. This warning warns rescuers that a current flow may still be present. The rescuers can then, for example, use the service disconnect device 6 for completely shutting off power when they want to secure the motor vehicle in this regard.

It should be noted at this point that the method according to the invention for energy management following a collision need not necessarily be carried out during each collision, but that a particular condition may be defined, for example, when a collision severity value exceeds a limit value. This prevents that vehicle systems 9 still required by the driver are disconnected during less hazardous collisions that affect the safety of the motor vehicle to a lesser degree and that ultimately even a complete deenergization takes place, especially in cases where the motor vehicle and the driver can be expected to be still functional and continue to control the motor vehicle.

Figure 2:
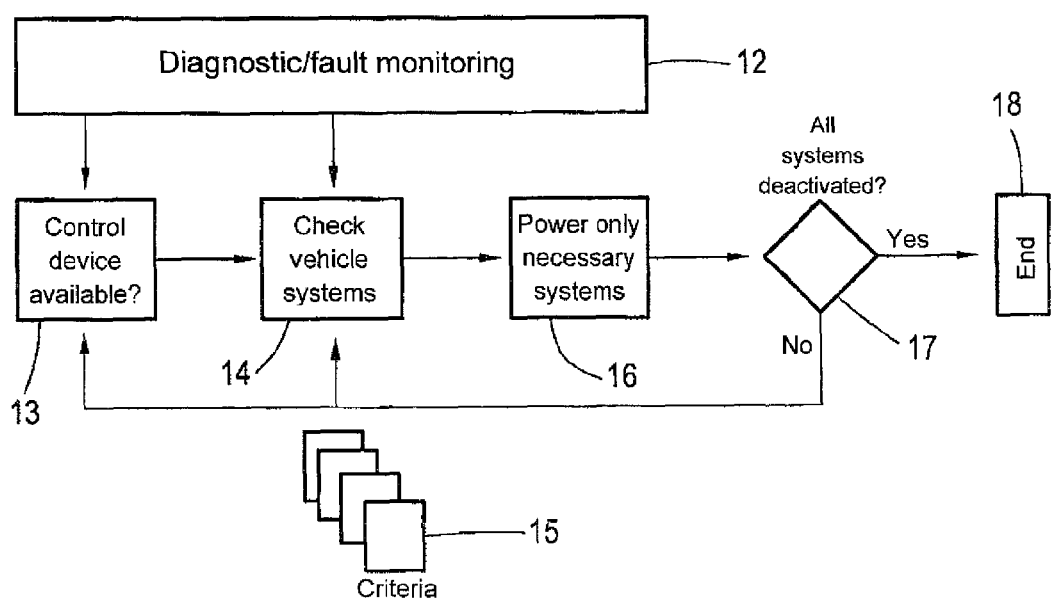
FIG. 2 a schematic diagram of the process flow of the method according to the invention.

FIG. 2 is a schematic diagram illustrating in more detail the process flow of the method according to the invention for operating the motor vehicle 1. Initially, the box 12 schematically indicates constantly running diagnostic and fault monitoring operations within the motor vehicle 1, in particular based on the control devices 8 and 10 (the latter with respect to the control device 8). Many vehicle systems, which include in addition to sensors, actuators and control devices also all other conceivable devices requiring electrical energy, have internal diagnostic functions enabling them to report their basic functionality, for example, via bus system (not shown in FIG. 1), especially upon request. However, external diagnostic operations carried out in particular in the control device 8 are also conceivable, for example by querying replies from other vehicle systems via the bus system or by performing plausibility checks of data provided by other vehicle systems. Various possibilities known in the art are therefore conceivable for obtaining information describing the basic functionality and/or the extent of the functionality of individual vehicle systems.

It is first checked in a step 13 whether the control device 8 of the energy management system 7 is available and is operative with respect to the inventive method. If this is not the case, the on-board electrical system 2 is disconnected from the battery 3 by way of the main switch 4, as already described above.

Otherwise, criteria 15 for each of the vehicle systems 9 are checked by the control device 8 in a step 14, to determine whether the vehicle system 9 is to be deenergized.

Within the context of a first criterion 15, all other vehicle systems 9 that cover all vehicle systems requiring electrical energy are divided into three groups. A first group of vehicle systems 9 includes the vehicle systems that must be deenergized immediately after the collision, in this case immediately after conclusion of the collision. These are the vehicle systems that cannot contribute to safety actions enhancing the safety of the motor vehicle 1, in particular with respect to consequential collisions, or may even lead to a further hazard. The first group may include the fuel pump and/or comfort electronics and/or a rear window defroster and/or components of an air conditioning system. In particular, components that are uniquely associated with the comfort of a driver, for example, a CD changer and the like, can therefore be designated to be immediately deenergized. These vehicle systems 9 of the first group may also be connected to a single supply line, as indicated in top part of FIG. 1, so that they can ultimately be deactivated in a single switching operation.

A second group of vehicle systems 9 includes those systems that should be deenergized only after performing a safety action. If it is found, for example from a status of these vehicle systems 9, that the safety action that these systems can perform without input from additional vehicle systems 9, was carried out, then these vehicle systems 9 of the second group can also be deenergized. In particular, a kind of pre-crash preparation can be carried out or completed by way of the second group. This refers to a particular set of safety actions, for example, raising the engine hood, closing windows, assuming a particular seating position, adjusting the chassis to another chassis height and the like. Regarding the second group, deenergization is therefore judged as to whether the safety action has already been performed. If this is the case and if additional safety actions from the vehicle system 9 of the second group are no longer necessary and/or possible, then these systems can also be deenergized. This second class of vehicle systems 9 includes also those systems which provide actions that indirectly contribute to safety, by, for example, ensuring that the trunk is unlocked or making an emergency call (emergency call system).

A third group of vehicle systems 9 includes those systems that are in principle able to perform measures enhancing the safety of the occupants of the vehicle or safety actions, while being dependent on other vehicle systems and/or certain available data. As already mentioned, it is continuously monitored in box 12, whether certain vehicle systems 9, especially those that have not already been deenergized, are still available and are able to perform their preliminary functionality. For example, a multi-stage triggering airbag, whose second stage has not yet been triggered, requires information from collision sensors or impact sensors for triggering. If the corresponding sensors are no longer available, it would not make sense to continue to operate the airbag system. Similarly, more complex cases of vehicle systems 9 of the third group exist, such as safety systems, whose objective it is to place the motor vehicle 1 in the safest possible position with respect to consequential collisions. This requires that not only data about the motor vehicle 1 itself (ego data) and environmental data need to be considered, but it must also be possible to reasonably control actual actuators of the motor vehicle, in particular the steering and/or a motor and/or a brake system, in order to take adequate measures. This results in a network of dependencies that can be mapped by corresponding availability criteria 15. Of course, it should also be assessed in vehicle systems 9, whether they are needed by other vehicle systems 9 and the like. Such criterion 9 is ultimately to be understood as a set of rules that evaluates availability information about the other vehicle systems 9 with respect to a vehicle system 9 and then decides whether the vehicle system 9 can be deenergized.

It should be noted at this point that it can of course be considered that the failure of data sources, in particular sensors, can be at least partially compensated by relying on existing data that were already recorded before and/or during the collision. For example, when considering an environmental model, it can be assumed that the information entered in the environmental model continues to be valid at least for static objects, while information regarding moving objects can be predicted, for example, for an actual point in time. It is therefore contemplated within the context of the present invention to continue using data recorded before the collision or during the collision and to derive therefrom currently valid data, which can optionally be assigned a certain reliability to replace the failed data sources, which can also be considered in relation to the availability criteria.

Nevertheless, additional criteria 15 are considered in relation to the availability criterion of the vehicle systems of the third group, which relate to a still meaningful deenergization of these vehicle systems of the third group. For example, it can be checked with respect to the vehicle systems 9 of the third group whether a specific safety action has already been performed, for example, in a multi-stage airbag system, whether all stages of the multi-stage airbag system have been triggered, so that the airbag system can be switched off. Additionally or alternatively, it can also be analyzed whether meaningful safety actions still remain that could be performed by the vehicle system 9. For example, when it is the object to park the motor vehicle 1 as safely as possible, it can be checked whether this safe parking position and parking orientation has already been reached, in which case no further conceivably meaningful actions could be performed by the corresponding vehicle systems 9 of the third group, so that these systems can be deenergized. Also, passage of a predetermined period of time can be considered as a further criterion.

In addition to these group-related criteria, other additional criteria are considered in this exemplary embodiment of the method according to the invention. First, a criterion is provided that monitors the expiration of a predetermined period of time after the collision that applies globally for all vehicle systems 9. When this predetermined global period has expired, all vehicle systems 9 are essentially switched off, thereby ensuring that the motor vehicle 1 is deenergized after the duration defined by the period of time, which is an ultimate goal of the method according to the invention. For example, a duration of five minutes can be set.

Furthermore, see box 12, the information obtained about the availability of the vehicle systems 9 also considered with respect to a vehicle system 9 under consideration. If it is found that a vehicle system 9 is totally incapable of contributing to a safety action that increases the safety of the motor vehicle 1, for example, when it had failed completely, supply of power makes neither sense nor is it necessary, so that this vehicle system can be deenergized.

Finally, a prioritization is also provided in the event that the remaining available electrical energy is insufficient for all vehicle systems 9. In this case, first vehicle systems 9 assigned lower priorities can be deenergized based on priorities assigned to the vehicle systems 9, even though they really should still be operated. Thus, meaningful energy management with the still available energy can be envisioned even following a collision.

Another possible approach in the context of the present invention is to work with action plans. For example, in one a conceivable embodiment, an ideal action plan containing safety actions may be appropriate and feasible, assuming that all vehicle systems 9 are fully functional. Since box 12 constantly monitors the availability of vehicle systems 9, it can be determined, which of these actions of the action plan can actually be carried out, so that a feasible action plan with the remaining safety actions is in place, on which a criterion 15 will be based, so that only those vehicle systems 9 can receive power that participate in a safety action contained in the feasible action plan. It should be noted at this point that the control device 8 can also be used to centrally take over the control of the vehicle systems 9 for the implementation of the measures enhancing the safety of the motor vehicle 1 and safety actions.

In a step 16, the switching device 5 is then controlled so that only those vehicle systems 9 are supplied with electric power that need to be powered.

In a step 17, it is checked whether all vehicle systems 9 are already deactivated, i.e. deenergized. If this is the case, the method is terminated in a step 18, in particular by also disconnecting the control devices 8 and 10, i.e. the energy management system 7 itself, from the battery 3.

If not all vehicle systems 9 are deactivated, the steps are repeated, especially cyclically.

As long as there is some current flow in the motor vehicle 1, the warning device 11 is always operated to output the warning signal.

What is claimed is:

1. A method for supplying power to a motor vehicle having a plurality of vehicle systems, while operating the motor vehicle, during a collision or during a period of time following the collision, or both, comprising at least partially deenergizing the motor vehicle by:
    dividing, based on at least one criterion, the plurality of vehicle systems into at least three classes of vehicle systems,
    determining a supply of power to a particular vehicle system at least partially as a function of a class membership of the vehicle systems,
    determining a supply of power to the particular vehicle system during the collision or during the period of time following the collision, or both,
    deenergizing the vehicle systems based on the at least one criterion, with a first class of vehicle systems being deenergized immediately during or following the collision and with second class of vehicle systems being independently deenergized only after a safety action has been performed, and
    when an availability criterion for available data indicates that one or more of the vehicle systems belonging to at least one of the first and second class or data from the vehicle systems belonging to the first or second class are not available, deenergizing a third class of vehicle systems that depends from the vehicle systems of the first or second class or the data from the vehicle systems of the first or second class.

2. The method of claim 1, and further bringing the motor vehicle into at least one predefined safety state as a result of the performed safety action.

3. The method of claim 1, and further deenergizing a vehicle system that has not been deenergized due to the availability criterion when at least one additional criterion selected from criteria describing performing a safety action, non-availability of safety actions enhancing the safety of the motor vehicle and expiration of a certain period of time is satisfied.

4. The method of claim 1, wherein the available data comprise environmental data of a model environment determined prior to the collision.

5. The method of claim 1, and further comprising
    performing a diagnostic process of at least a portion of the vehicle systems of the motor vehicle, and
    deenergizing a vehicle system as a result of the diagnostic process when the vehicle system is not available.

6. The method of claim 1, wherein the at least one criterion comprises a prioritization, the method further comprising, depending on the available supply of power, deenergizing a vehicle system having higher priority later than a vehicle systems having lower priority.

7. The method of claim 1, further comprising
    determining at least one ideal action plan realizing an action of at least one of the plurality of vehicle systems for enhancing safety, and
    depending on results from a diagnosis of the at least one vehicle system affected by the action plan, determining a realizable action plan with at least one remaining action of the at least one vehicle system, wherein the at least one criterion comprises a presence of an action associated with the at least one vehicle system in the realizable action plan.

8. The method of claim 1, and further completely deenergizing the motor vehicle when a battery management system evaluating the at least one criterion is not available.

9. The method of claim 1, and further outputting a warning signal addressed to emergency personnel when at least one vehicle system is not deenergized.

10. A motor vehicle, comprising a plurality of vehicle systems divided into at least three classes of vehicle systems based on at least one criterion and at least one control device configured to supply power to the motor vehicle while operating the motor vehicle, during a collision or during a period of time following the collision, or both, wherein the at least one control device is further configured to at least partially deenergize the motor vehicle by
    determining a supply of power to a particular vehicle system at least partially as a function of a class membership of the vehicle systems and determining a supply of power to a particular vehicle system during the collision or following the collision, or both,
    deenergizing the vehicle systems based on the at least one criterion, with a first class of vehicle systems being deenergized immediately during or following the collision and with second class of vehicle systems being independently deenergized only after a safety action has been performed, and
    when an availability criterion indicates that one or more of the vehicle systems belonging to at least one of the first and second class or data from the vehicle systems belonging to the first or second class are not available, deenergizing a third class of vehicle systems that depends from the vehicle systems of the first or second class or the data from the vehicle systems of the first or second class.

* * * * *